Jan. 14, 1969  J. DEKKER  3,422,172
PRODUCTION OF PLASTIC FOAM SHEET
Filed March 16, 1966
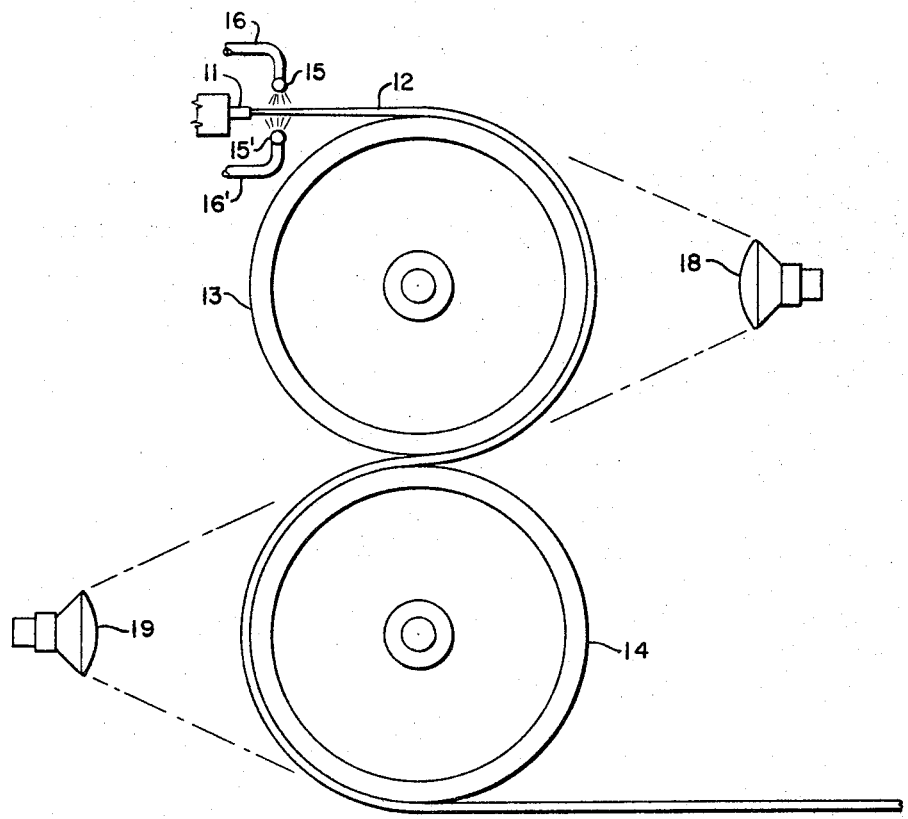
INVENTOR:
JAN DEKKER
BY: *Martin S. Baer*
HIS ATTORNEY

United States Patent Office 3,422,172
Patented Jan. 14, 1969

3,422,172
PRODUCTION OF PLASTIC FOAM SHEET
Jan Dekker, Delft, Netherlands, assignor to Shell Oil Company, New York, N.Y., a corporation of Delaware
Filed Mar. 16, 1966, Ser. No. 534,877
Claims priority, application Netherlands, Mar. 25, 1965, 6503780
U.S. Cl. 264—51       5 Claims
Int. Cl. B29d 27/00

ABSTRACT OF THE DISCLOSURE

In the extrusion of plates, webs, sheets or films of plastic foam through a slit film die, the extruded articles show objectionable corrugation. A simple method for removing such corrugation consists of successively stretching each of the surfaces of the extruded sheet or the like in a longitudinal direction by 4 to 20 percent while the opposite surface is not being stretched and while the surface being stretched is in heat-softened condition. Suitable apparatus for carrying out the method consists in passing the sheets over a succession of stacked rolls while providing for sufficient heating to maintain the surfaces in heat-softened condition.

---

This invention relates to a method for the production of plates, webs, sheets or films of a plastic foam by means of slit extrusion. The term "slit extrusion" in the specification and claims refers to extrusion through a die having an elongated orifice.

It is known to produce plastic foams by extruding thermoplastic polymers containing a blowing agent through a die. Suitable blowing agents include normally gaseous substances, volatile normally liquid compounds, e.g., aliphatic or halogenated aliphatic hydrocarbons, and certain organic compounds which release gas or vapor on thermal decomposition. When compositions of this type are extruded, released vapor or gas expands rapidly as soon as the plastic mass emerges from the extruder die into a free space, converting the extrudate into a foam.

The rapid expansion of the blowing agent will cause the plastic mass to expand in all directions. When a foamable mass is extruded through a slit, the increase of volume in the longitudinal direction and in the direction of the height of the extrudate proceeds easily; however, the increase of volume in the transverse direction of the extrudate appears seriously hindered. The increase of width actually observed is considerably less than could be expected theoretically. The insufficient transverse expansion is compensated by an extra increase in the thickness which increases, but this increase is not distributed evenly. As a result, the product has a very unsightly appearance with surfaces having irregular corrugations and creases. These corrugations and creases run in the longitudinal direction of the extrudate; it should therefore be possible, in theory, to remove them by stretching the foam in the lateral direction. However, this solution of the problem is technically cumbersome and not very attractive (see "British Plastics," August 1963, p. 453).

Another solution which has been proposed is the use of a die equipped with external forming members, for example a pair of plates or rolls. However, the forming members, which are in fact extensions of the walls of the slit-shaped die orifice, prevent the foam from expanding freely so that it is difficult or impossible to produce foams having frequently desired low specific gravities, e.g., below 150 g./liter. Moreover, the friction between the forming members and the extrudate makes it difficult to avoid interruptions in the process.

Because of these problems, the simple slit extrusion method has not been considered attractive for the production of foamed polymer sheet.

The object of the present invention is to provide a method for producing by slit extrusion plastic foam sheet product having attractive, smooth and flat surfaces. According to the invention, the upper and lower surfaces of hot extrudate from a slit die which has been allowed to expand freely are flattened during the cooling of the extrudate by slightly stretching said surfaces successively in a longitudinal direction.

It has been found that by means of the simple step of stretching both surfaces slightly but successively in the longitudinal direction it is possible to produce films, sheets, webs or plates even of a considerable thickness, for example 15 to 20 mm., which possess surfaces which are completely smooth and thus entirely free of creases and corrugations.

The degree of stretching necessary to obtain the desired improvement can easily be determined on the basis of a few routine tests. Since the stretching of the surfaces is carried out successively, and therefore one surface of the product is necessarily at rest while the other is being stretched, each stretching operation may be defined as a relative stretching of one surface with respect to the other surface at rest. In this connection the desired relative increase in length of the surface subjected to the stretching will as a rule not exceed 20%, while in most cases an increase in length of a few percent, e.g., 4% to 10% is sufficient to bring about the desired movement.

In view of this slight degree of stretching the stretching process can be carried out very easily by bending the extrudate in a transverse direction, i.e., parallel to the main dimension of the extruded sheet. This bending in the transverse direction is preferably carried out by passing the extrudate over a roll. To stretch each of the two surfaces of the extrudate at least two of these rolls are necessary, but if desired more rolls may be used.

Preferably two rolls are arranged so that the extrudate follows an S-shaped path when passing over these rolls. It is desirable to keep the extrudate in contact with each roll over a sector defined by an arc of 120° to 240° of the roll. Generally speaking, the dimensions of suitable rolls can vary from 15 to 60 cm. diameter; rolls having large diameters, for example from 40 to 60 cm., are particularly suitable for the production of thick extrudates, for example plates having a thickness of more than 10 mm. while the smaller rolls are preferred for thinner extrudates.

The extrudate is usually cooled by exposure to outside air. If desired, forced cooling, for example by blowing with a cold air stream, may be employed. During the cooling process care must be taken that the temperature of these surfaces does not drop below that at which satisfactory stretching is still possible. It is essential that the temperature of the plastic at the surface, during stretching, is above the softening point of the plastic.

When one surface is being stretched the temperature thereof will drop as a result of normal contact with the outside air, and therefore, it is normally necessary during the stretching of the first surface to prevent an undesired drop in temperature of the second surface which is not stretched until a subsequent operation. When the stretching takes place by bending on a roll, the desired surface temperature can very easily be controlled by controlling the temperature of the roll. In this case the temperature of the first roll, on which the outwardly facing surface is being stretched, is kept high enough to prevent the temperature of the inwardly facing surface from dropping below the softening point.

The temperature of the second roll on which the other surface, now outwardly faced, is stretched can also be controlled in order to prevent this surface from cooling to a temperature below the softening point of the plastic before the desired degree of stretching is obtained. Too much cooling of the outer surface of the foam can also be prevented by the provision of external heating, for example radiant heating, e.g., with one or more infrared lamps.

A preferred mode of practicing this invention is illustrated by the sole figure of the drawing, which is a schematic illustration of apparatus suitable for practicing the invention.

In the drawing, figure 11 represents a slit die of an extruder from which an expandable thermoplastic mass above its flow temperature is being extruded. The extruder may be a single screw extruder or a twin screw extruder of the type heretofore used in extrusion of foamable plastic masses. The extrudate 12 is in the form of a sheet which rapidly expands to its approximate ultimate dimensions. Optionally, relatively cold air may be blown onto the sheet from distributor pipes 15 and 15′, fed by supply pipes 16 and 16′. The foamed sheet, while still in softened condition, passes over rolls 14 and 15, as illustrated, and is then drawn off onto a collecting roll, not shown. The rolls are driven at controlled speed in well known manner by driving means not shown, and are suitably heated in well known manner by internal heating means, not shown. As explained above, the side of the sheet which is in contact with rolls 13 and 14 does not change in dimension during the time it is in such contact, but the opposite side is stretched. Banks of radiant lamps 18 and 19 may be employed, if desired, to keep the exposed side of the sheet at a desired temperature at or above the softening temperature of the plastic.

Suitable plastics for use in the process according to the invention are thermoplastic polymers, in particular polymers from olefinically unsaturated monomers, by which are understood vinyl aromatic monomers, such as styrene, vinyl halide monomers such as vinyl chloride and olefins such as ethylene or propylene. Particularly suitable polyolefins are those polymers having a crystalline structure, including the so-called low-pressure polyethylene and isotactic polypropylene.

The blowing agent can be a normally liquid organic substance which has substantially no solvent action on said thermoplastic polymer, or a mixture of such organic substances. If desired, such a substance or mixture thereof can be used together with a small amount of a solvent for said polymer. Preferably the blowing agent is an organic liquid boiling, at normal pressure, between about 10° C. and suitably between about 25° and about 80° C. Generally preferred are saturated aliphatic hydrocarbons or mixtures thereof such, for example, as n-pentane or technical pentane or a mixture of n-pentane and iso-pentane containing between 25 and 80% by weight of iso-pentane. Butanes, particularly n-butane and also suitable, as are petroleum ethers, hexane, and cyclopentane. Fluorochlorocarbons are also known as expanding agents, e.g., $CCl_2F$—$CClF_2$, which boils at about 48° C., has been used in polystyrene.

Blowing agents which act by chemical or thermal decomposition to liberate a gas such as carbon dioxide or nitrogen are known commercial materials. Typical are p,p′-oxibis(benzenesulfonyl hydrazide), sold under the trade name "Celogen," and azo-dicarbonamide. Another, typically employed with polystyrene, is a mixture of sodium bicarbonate with a solid acid such as tartaric or citric acid.

The feed to the extruder can be a plastic which contains a blowing agent. Alternatively, the plastic and the blowing agent can be separately charged to the extruder such that the blowing agent is mixed with the melted or plasticized plastic.

The foamable mixture which is forced out through the extruder die may also contain a combination of a vaporizable liquid blowing agent with one or more gas-liberating decomposable substances, the latter being included to modify the cell-size and the cell-size distribution in the foam.

By varying the quantity of blowing agent and the type and quantity of the substances regulating the cell-size it is possible to extrude plastic foams of many difference densities and cell sizes. The method of the invention is particularly suitable for use with plastic foams which, before stretching, have a density of 30 to 150 grams per liter and an average cell-size of 0.1 to 0.4 mm.

In the product obtained by the method of the invention the cells are slightly elongated in the direction of stretching. This elongation can be reduced or even converted into an elongation in the direction of height of the foam by subjecting the extrudate to a post-expansion treatment, for example by subsequently heating the foam to temperatures at which the plastic is plastically deformable. A treatment of this kind has the advantage that the density of the foam is lowered, and that the products acquire a greater flexibility and a reduced brittleness.

EXAMPLE I

An expandable polystyrene having a melt index 2 to 4 and containing approximately 5% by weight of pentane as solvent was extruded; 0.5% by weight of sodium bicarbonate and 0.4% by weight of citric acid was used as cell-size regulating system. The mass was forced through a die which was provided with a rectangular slit 600 mm. long and 2 mm. wide. The extrudate issuing from the die had a temperature of 130° C. and expanded immediately to a foam having a density of 80 g./liter and a homogeneous cell-size of 0.2 to 0.3 mm. Both surfaces of the foam were irregularly creased in the longitudinal direction.

The foamed extrudate was subsequently passed over a pair of rolls following a downwardly directed S-shaped path over these rolls. The first contact between the foam and the surface of the first roll took place at a distance of approximately 10 cm. from the extrusion slit. The rolls each had a diameter of 20 cm., and the temperature thereof was kept under close control, the first roll being maintained at 115° C. during the experiment and the second at 110° C. The center-to-center distance of the two rolls was 205 mm.

The extrudate was drawn by conventional hauling equipment with sufficient tension to prevent the inwardly curved surface of the extrudate on each roll from wrinkling in the lateral direction. However, the tensile force was not great enough to cause any stretching of the surface facing the roll.

From this experiment a sheet of polystyrene foam was obtained having a thickness of 4 mm., a density of 130 g./liter and a cell-size of 0.2 to 0.4 mm., the cells being somewhat elongated in the longitudinal direction. The two surfaces of the sheet were completely smooth and entirely free from creases or corrugations.

The experiment was repeated under the same conditions with the following exceptions:

|  | Mm. |
|---|---|
| Slit width | 6 |
| Center-to-center distance of the rolls | 212 |

A sheet of polystyrene foam was obtained having a thickness of 10 mm., a density of 95 g./liter, a cell-size of 0.2 to 0.4 mm. and completely smooth surfaces.

EXAMPLE II

Polypropylene having a melt index of 0.5 was extruded. As blowing agent 5% by weight of pentane was directly injected into the extruder at a point where the polymer in the extruder had already melted. The mixture to be extruded also contained 0.5% by weight of azodicarbonamide as cell-size regulating compound and had a temperature of 145° C. on discharge from the die.

The foam obtained by extrusion through a 5 mm. wide die had a density of 35 g./liter and a cell-size of 0.1 to 0.3 mm. Many longitudinal creases and corrugations were visible on the surface of the foam.

Under similar conditions to those described in Example I the foam was drawn over a pair of rolls having a diameter of 40 cm. and a center-to-center distance of 420 mm., the pair of rolls being placed one above the other so that the extrudate followed an upwardly directed S-shaped path. Moreover, a support roll also having a diameter of 40 cm. was positioned below the first roll, the center-to-center distance of the support roll to the first roll being 412 mm. The distance from the extrusion slit to the point at which the extruder first came in contact with the first roll was 25 cm.

The temperature of the rolls were set as follows:

|  | °C. |
|---|---|
| Support roll | 135 |
| First roll | 135 |
| Second roll | 125 |

The foam which was taken off from the second roll possessed, after continued cooling of the entire sheet to room temperature, a density of 50 g./liter, a thickness of 10 mm. and a cell-size of 0.1–0.4 mm.; both surfaces of the foam were completely smooth.

The percentage of stretching of the outer surface, when the surface in contact with the roll is not stretched, is given by the formula: percent stretch=$100(2T/D)$; where T is the thickness of the sheet and D is the diameter of the roll, both in identical units of length. In Example I, the percentage of stretch over each roll was accordingly 4% in the case of the 4 mm. sheet and 10% in the case of the 10 mm. sheet. In Example II, the percentage of stretch was 5%.

I claim as my invention:

1. In the production of sheets of a thermoplastic foam by means of extrusion through a slit die, the improvement which comprises removing corrugations from the upper and lower surfaces of the hot extrudate by successively stretching each of said surfaces in a longitudinal direction by 4 to 20% while the opposite surface is not being stretched, said surfaces being in a heat-softened condition while being thus stretched.

2. A method according to claim 1, wherein each of said surfaces is stretched by bending the extrudate over a roll in the transverse direction, without substantial longitudinal change in dimension of the inwardly curved surface of the extrudate, the angle of contact with said roll being between 120° C. and 240° C.

3. The method according to claim 2 wherein said thermoplastic is polystyrene, said extrudate is extruded at about 130° C., and said extrudate is stretched over two heated rolls, the first maintained at about 115° C. and the second at about 110° C.

4. The method according to claim 2 wherein said thermoplastic is polypropylene, said extrudate is extruded at about 145° C., and said extrudate is stretched over two heated rolls, the first maintained at about 135° C. and the second at about 125° C.

5. The method according to claim 2 wherein said extrudate has a thickness in the range from 3 to 20 millimeters and said rolls have diameters in the range from 15 to 60 centimeters.

References Cited

UNITED STATES PATENTS

| 2,767,435 | 10/1956 | Alles | 264—288 |
| 3,335,207 | 8/1967 | Richie. | |

FOREIGN PATENTS 1,008,569  10/1965  Great Britain.

OTHER REFERENCES

Collins, F. H.: "Controlled Density Polystyrene Foam Extrusion," SPE Journal, July 1960, pp. 705–709.

Davies, D. N.: "The Extrusion, Fabrication and Application of Thin Expanded Polystyrene Sheet," British Plastics, August 1963, pp. 452–457.

Gliniecki, V.: "Equipment Needed for the Extrusion of Expandable Polystyrene Beads," Plastics Design & Processing, September 1964, pp. 18–21.

JULIUS FROME, *Primary Examiner.*

PHILIP E. ANDERSON, *Assistant Examiner.*

U.S. Cl. X.R.

18—5; 264—48, 288, 321